US009344922B2

(12) United States Patent
Kim et al.

(10) Patent No.: US 9,344,922 B2
(45) Date of Patent: May 17, 2016

(54) RADIO COMMUNICATION SYSTEM AND BASE STATION

(71) Applicant: NTT DOCOMO, INC., Tokyo (JP)

(72) Inventors: Jinho Kim, Tokyo (JP); Hiroto Yasuda, Tokyo (JP); Yasufumi Morioka, Tokyo (JP); Hideaki Takahashi, Tokyo (JP); Junichiro Hagiwara, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 16 days.

(21) Appl. No.: 14/406,757

(22) PCT Filed: May 14, 2013

(86) PCT No.: PCT/JP2013/063391
§ 371 (c)(1),
(2) Date: Dec. 10, 2014

(87) PCT Pub. No.: WO2013/190929
PCT Pub. Date: Dec. 27, 2013

(65) Prior Publication Data
US 2015/0172963 A1     Jun. 18, 2015

(30) Foreign Application Priority Data

Jun. 22, 2012 (JP) .................................. 2012-140900

(51) Int. Cl.
| | | |
|---|---|---|
| *H04W 4/00* | (2009.01) | |
| *H04W 36/00* | (2009.01) | |
| *H04W 76/02* | (2009.01) | |

(52) U.S. Cl.
CPC ........ *H04W 36/0027* (2013.01); *H04W 76/022* (2013.01); *H04W 36/0088* (2013.01)

(58) Field of Classification Search
None
See application file for complete search history.

(56) References Cited

U.S. PATENT DOCUMENTS

| | | | |
|---|---|---|---|
| 2015/0004990 A1* | 1/2015 | Uchino | H04W 72/0406 455/450 |
| 2015/0146688 A1* | 5/2015 | Yasuda | H04W 36/0055 370/331 |
| 2015/0156737 A1* | 6/2015 | Harada | H04W 16/32 445/434 |
| 2015/0208393 A1* | 7/2015 | Uchino | H04W 8/26 370/329 |

(Continued)

OTHER PUBLICATIONS

3GPP TS 36.300 V10.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Dec. 2011 (194 pages).

(Continued)

*Primary Examiner* — Anh-Vu Ly
(74) *Attorney, Agent, or Firm* — Osha Liang LLP

(57) ABSTRACT

A radio communication system has a user equipment, a first base station, a second base station, and a gateway device. The first base station is capable of executing radio resource control of the user equipment, whereas the second base station does not execute radio resource control of the user equipment. The first base station, based on a measurement report message, determines whether a user-plane path is to be established between the first base station and the second base station. In a case in which it is determined that a user-plane path is to be established, the first base station establishes a user-plane path between the first base station and the second base station. Also, the first base station controls the user equipment to establish a user-plane path between the user equipment and the second base station.

11 Claims, 12 Drawing Sheets

(56) References Cited

U.S. PATENT DOCUMENTS

| | | | | |
|---|---|---|---|---|
| 2015/0230212 A1* | 8/2015 | Uchino | ................... | H04W 8/26 455/552.1 |
| 2015/0245386 A1* | 8/2015 | Uchino | ................. | H04W 74/02 370/329 |
| 2015/0304914 A1* | 10/2015 | Uchino | ................... | H04W 8/26 455/443 |
| 2015/0312752 A1* | 10/2015 | Uchino | ................. | H04W 16/30 370/329 |
| 2015/0312810 A1* | 10/2015 | Yasuda | ................. | H04W 36/08 370/338 |
| 2015/0319795 A1* | 11/2015 | Kim | .................... | H04W 76/022 370/329 |

OTHER PUBLICATIONS

H. Ishii, et al.; "A Novel Architecture for LTE-B; GC'12 Workshop: International Workshop on Emerging Technologies for LTE-Advanced and Beyond -4G;" Dec. 3, 2012; pp. 624-630 (7 pages).

International Search Report for corresponding International Application No. PCT/JP2013/063391; mailed Jun. 11, 2013 (1 page).

* cited by examiner

RADIO COMMUNICATION SYSTEM AND BASE STATION

FIELD OF THE INVENTION

The present invention relates to a radio communication system and to a base station.

BACKGROUND ART

Various types of radio communication systems in accordance with the 3GPP (Third Generation Partnership Project) standard are in use. In the radio communication system that complies with the LTE/SAE (Long Term Evolution/System Architecture Evolution) standard with 3GPP, a logical communication path (user-plane path) used for user data communication is established between a gateway device and user equipments, via an eNB (evolved Node B), which is a radio base station. User equipments can perform communication with an external network (the Internet, etc.), using the established U-Plane path.

The eNB has a communication path (control-plane path) for transmitting and receiving control signals to and from other eNBs, a switching station, and a user equipment. An eNB, when it is radio-connecting with a user equipment and when the user equipment moves to a cell which a different eNB forms, transmits and receives control messages to and from the user equipment and the different eNB via a control-plane path, and operates so as to make the user equipment handover to the different eNB. When the user equipment is handed over, a user-plane path is changed so as to pass an eNB to which the user equipment is handed over.

RELATED ART DOCUMENTS

Non-Patent Documents

Non-Patent Document 1 3GPP TS 36.300 V10.6.0 (2011-12), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)

SUMMARY OF THE INVENTION

Problem to be Solved by the Invention

In addition to the eNB such as above, we assume that a radio communication system has a base station that is connected to an eNB and does not have a control-plane path to the user equipment (base station having limited control functions). Because such a base station is connected to an eNB but is not connected to a gateway device, such a base station cannot transmit and receive user data directly to and from the gateway device. Furthermore, such a base station cannot transmit and receive control messages to and from the user equipment directly because a control-plane path to the user equipment is not provided. Therefore, according to a conventional radio communication system, it is difficult to realize a system configuration using such a base station.

In consideration of the above conditions, the present invention has, as an object, to realize a radio communication system having a base station with a limited control function.

Means to Solve the Problem

A radio communication system of the present invention has a user equipment; plural base stations; and a gateway device, the plural base stations including: a first base station that executes, via a control-plane path, radio resource control of the user equipment; and a second base station that does not execute radio resource control of the user equipment. The first base station has a measurement report message receiver configured to receive a measurement report message regarding radio waves transmitted from the base stations, the message being transmitted from the user equipment; a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device; a user-plane path controller configured to, when the determiner determines to establish the third user-plane path, establish the third user-plane path between the first base station and the second base station, and to associate the established third user-plane path with the second user-plane path; and a radio connection configurator configured to transmit, to the user equipment, a radio connection reconfiguration message instructing the user equipment to establish a fourth user-plane path between the user equipment and the second base station, and the second base station has a user-plane path processor configured to associate the fourth user-plane path established by the user equipment with the third user-plane path.

With the above configuration, a third user-plane path is established between a first base station and a second base station, and a fourth user-plane path is established between the user equipment and the second base station having no control-plane path with respect to a user equipment (not performing radio resource control of the user equipment). Accordingly, the user equipment is enabled to transmit and receive user signals via the second base station, which is not connected directly with a gateway device. That is to say, a radio communication system provided with the second base station not performing radio resource control of the user equipment (i.e., having limited control functions) is realized.

Another radio communication system of the present invention has a user equipment; plural base stations; a switching station; and a gateway device, the plural base stations including: a first base station that executes, via a control-plane path, radio resource control of the user equipment; and a second base station that does not execute radio resource control of the user equipment. The first base station has a measurement report message receiver configured to receive a measurement report message regarding radio waves from the base stations, the message being transmitted from the user equipment; and a transferor configured to transfer the measurement report message to the switching station, and the switching station has a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device; and a determination result transmitter configured to transmit a determination result of the determiner to the first base station. The first base station additionally has a user-plane path controller configured to, when the determination result indicates a determination that the third user-plane path is to be established, establish the third user-plane path between the first base station and the second base station, and to associate the established third user-plane path with the second user-plane path; and a radio connection configurator configured to transmit, to the user equipment, a radio connection reconfiguration message instructing to establish a fourth user-plane path between the user equipment and the second base station, and the second base station has a user-plane path processor configured to associate the fourth user-plane path established by the user equipment with the third user-plane path.

With the above configuration, a third user-plane path is established between a first base station and a second base station, and a fourth user-plane path is established between the second base station having no control-plane path to a user equipment (not performing radio resource control of the user equipment) and the user equipment. Accordingly, the user equipment is enabled to transmit and receive user signals via the second base station, which is not connected directly with a gateway device. That is to say, the radio communication system provided with the second base station not performing radio resource control of the user equipment (i.e., having limited control functions) is realized.

In a preferred embodiment of the present invention, the user-plane path controller of the first base station releases the first user-plane path after the third user-plane path and the fourth user-plane path are associated.

With the above configuration, because the first user-plane path that has been established between the user equipment and the first base station is released after the user equipment is enabled to exchange user signals via the second base station, the continuity of radio communication can be maintained, and the effective use of the radio resource is realized.

In a preferred embodiment of the present invention, the user-plane path controller of the first base station transmits, to a second base station, a path establishment request message including identification information of the first base station and requiring establishment of the third user-plane path, the user-plane path processor of the second base station transmits a path establishment response message containing identification information of the second base station in response to the path establishment request message, and the radio connection configurator of the first base station transmits, to the user equipment, the radio connection reconfiguration message containing the identification information of the second base station. The user equipment has a communication controller configured to establish the fourth user-plane path based on the radio connection reconfiguration message by accessing the second base station.

With the above configuration, a first base station having a control-plane path to a user equipment, instead of a second base station having no control-plane path to the user equipment, transmits a radio connection reconfiguration message to the user equipment, whereby a radio connection (fourth user-plane path) between the user equipment and the second base station is established.

Another radio communication system of the present invention has a user equipment; plural base stations; and a gateway device, the plural base stations including: a first base station that executes, via a control-plane path, radio resource control of the user equipment; and a second base station that does not execute radio resource control of the user equipment. The first base station has a measurement report message receiver configured to receive a measurement report message regarding radio waves transmitted from the base stations, the message being transmitted from the user equipment; a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path between the second base station and the user equipment is established in association with the third user-plane path; and a user-plane path controller configured to, in a case in which the determiner determines to establish the first user-plane path, establish the first user-plane path between the user equipment and the first base station.

With the above configuration, a first user-plane path between a user equipment and a first base station is established. Therefore, a user equipment that was executing radio communication via a second base station at the beginning is enabled to transmit and receive user signals via the first base station. That is to say, the radio communication system provided with the second base station not performing radio resource control of the user equipment (i.e., having limited control functions) is realized.

In a preferred embodiment of the present invention, when the determiner determines to establish the first user-plane path, the user-plane path controller of the first base station transmits, to the second base station, a path release request message requiring release of the fourth user-plane path, and the second base station has a user-plane path processor configured to release the fourth user-plane path based on the path release request message, and to transmit a path release response message to the first base station after releasing the fourth user-plane path, and the user-plane path controller of the first base station, upon receiving the path release response message, releases the third user-plane path.

With the above configuration, because the third user-plane path established between the first base station and the second base station and the fourth user-plane path established between the second base station and the user equipment are released as a result of the first user-plane path having been established, the effective use of a radio resource is realized.

Another radio communication system of the present invention has a user equipment; plural base stations; a switching station; and a gateway device, the plural base stations including: a first base station that executes, via a control-plane path, radio resource control of the user equipment; and a second base station that does not execute radio resource control of the user equipment. The first base station has a measurement report message receiver configured to receive a measurement report message regarding radio waves transmitted from the base stations, the message being transmitted from the user equipment; and a transferor configured to transfer the measurement report message to the switching station. The switching station has a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path between the second base station and the user equipment is established in association with the third user-plane path; and a determination result transmitter configured to transmit a determination result of the determiner to the first base station. The first base station additionally has a user-plane path controller configured to, when the determination result indicates a determination that the first user-plane path is to be established, establish the first user-plane path between the user equipment and the first base station.

With the above configuration, a first user-plane path between a user equipment and a first base station is established. Therefore, a user equipment that was executing radio communication via the second base station at the beginning is enabled to transmit and receive user signals via the first base station. That is to say, the radio communication system provided with the second base station not performing radio resource control of the user equipment (i.e., having limited control functions) is realized.

In a preferred embodiment of the present invention, the user-plane path controller of the first base station, when the determination result indicates a determination that the first user-plane path is to be established, transmits to the second base station a path release request message requiring release of the fourth user-plane path, and the second base station has a user-plane path processor configured to release the fourth user-plane path based on the path release request message, and to transmit a path release response message to the first base station after releasing the fourth user-plane path, and the user-plane path controller of the first base station, upon receiving the path release response message, releases the third user-plane path.

With the above configuration, because the third user-plane path established between the first base station and the second base station and the fourth user-plane path established between the second base station and the user equipment are released as a result of the first user-plane path having been established, the effective use of a radio resource is realized.

In a preferred embodiment of the present invention, the first base station additionally has a radio connection controller configured to transmit a radio connection reconfiguration message, and in a case in which the first user-plane path is to be established, when a user-plane path already exists between the user equipment and the first base station, the user-plane path controller of the first base station associates the user-plane path with the second user-plane path to regard the user-plane path as the first user-plane path, whereas when a user-plane path does not exist between the user equipment and the first base station, the user-plane path controller of the first base station controls the radio connection controller to transmit, to the user equipment, a radio connection reconfiguration message instructing establishment of the first user-plane path between the user equipment and the first base station.

With the above configuration, in a case in which the first user-plane path is to be established, when the user-plane path has already been established, the existing user-plane becomes the first user-plane path. Therefore, the radio resource can be effectively utilized.

A base station of the present invention is a base station for use in a radio communication system having: a user equipment; plural base stations; and a gateway device, the plural base stations including: a first base station that executes, via a control-plane path, radio resource control of the user equipment; and a second base station that does not execute radio resource control of the user equipment. The first base station has a measurement report message receiver configured to receive a measurement report message regarding radio waves transmitted from the base stations, the message being transmitted from the user equipment; a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device; a user-plane path controller configured to, when the determiner determines to establish the third user-plane path, establish the third user-plane path between the first base station and the second base station, and to associate the established third user-plane path with the second user-plane path; and a radio connection configurator configured to transmit, to the user equipment, a radio connection reconfiguration message instructing the user equipment to establish a fourth user-plane path between the user equipment and the second base station.

Another base station of the present invention is a base station for use in a radio communication system having a user equipment; plural base stations; and a gateway device, the plural base stations including: a first base station that executes, via a control-plane path, radio resource control of the user equipment; and a second base station that does not execute radio resource control of the user equipment. The first base station has: a measurement report message receiver configured to receive a measurement report message regarding radio waves transmitted from the base stations, the message being transmitted from the user equipment; a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path between the second base station and the user equipment is established in association with the third user-plane path; and a user-plane path controller configured to, in a case in which the determiner determines to establish the first user-plane path, establish the first user-plane path between the user equipment and the first base station.

DESCRIPTION OF EMBODIMENTS

First Embodiment

1(1). Configuration of Radio Communication System

Figure 1:
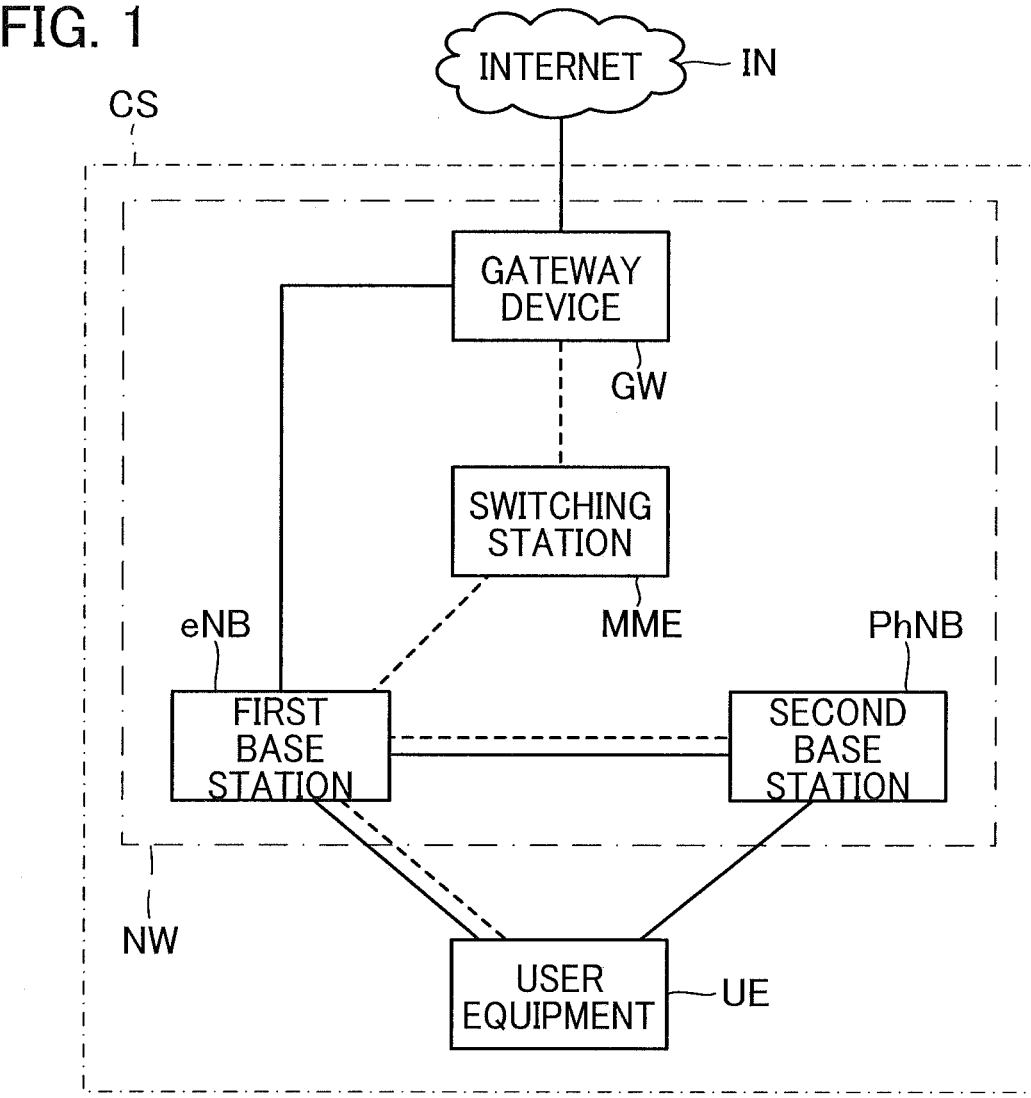
FIG. 1 is a block diagram showing a radio communication system according to a first embodiment of the present invention.

FIG. 1 is a block diagram showing a radio communication system CS according to a first embodiment of the present invention. The radio communication system CS has, as its elements, a user equipment UE, a first base station eNB, a second base station PhNB, a switching station MIME, and a gateway GW. A network NW has all elements except for the user equipment UE from among the above elements of the radio communication system CS.

Each element of the radio communication system CS executes communication in accordance with a predetermined access technology such as the LTE/SAE (Long Term Evolution/System Architecture Evolution) prescribed in the 3GPP standard (Third Generation Partnership Project). According to terms defined in the 3GPP standard, the user equipment UE is "User Equipment", the first base station eNB is "evolved Node B, the switching station MIME is "Mobile Management Entity", and the gateway device GW is "Packet-Data-Network/Serving Gateway", i.e., "SAE Gateway". Furthermore, the second base station PhNB is a base station which depends on the first base station eNB for all or a part of the control functions (described below in detail).

According to the present embodiment, description is given of an embodiment in which the radio communication system CS operates in accordance with the LTE/SAE, but it is not intended to limit the scope of the present invention. The present invention is applicable to other radio access technologies when necessary design changes are made.

The user equipment UE is capable of communicating by radio with the first base station eNB and the second base station PhNB. A system of the radio communication between the user equipment UE and each base station (eNB, PhNB) can be freely selected. For example, OFDMA (Orthogonal Frequency Division Multiple Access) may be adopted for downlink, whereas SC-FDMA (Single-Carrier Frequency Division Multiple Access) may be adopted for uplink.

The first base station eNB is connected to the second base station PhNB, the switching station MME, and to the gateway device GW by wire. The second base station PhNB is connected to the first base station eNB by wire. A configuration can be employed in which the first base station eNB and the second base station PhNB are connected by radio. The gateway device GW is connected to the first base station eNB and the switching station MIME as well as to the Internet IN, which is an external network with respect to the radio communication system CS. That is, the gateway device GW serves as a connection point (access point) with the eternal network.

In FIG. 1, the solid line indicates a path used for exchanging user signals (signals showing user data such as speech signals and data signals), and the dashed line indicates a path for exchanging control signals. That is, the solid line indicates a U-Plane (User Plane) interface, and the dashed line indicates a C-Plane (Control Plane) interface. The U-Plane path is established via the U-Plane interface, and the C-Plane path is established via the C-Plane interface.

In the above interfaces, a protocol configuration of an EPS (Evolved Packet System) prescribed in the 3GPP is employed in principle. Furthermore, as for an interface which is not defined by the above protocol configuration, an X3 interface exists between the first base station eNB and the second base station PhNB, and a Ph-Uu interface exists between the second base station PhNB and the user equipment UE. It is to be noted that there is no C-plane interface between the second base station PhNB and the user equipment UE.

In the radio communication system CS, signals are exchanged via a bearer (Bearer) which is a logical path. The bearer is a logical path that is established and released as needed. For the U-Plane, a data radio bearer DRB is established between the user equipment UE and the first base station eNB, or between the user equipment UE and the second base station PhNB. An X3 bearer X3B is established between the first base station eNB and the second base station PhNB. An S1 bearer is established between the first base station eNB and the gateway device GW. A bearer (X3 bearer X3B, S1 bearer, etc.) established in the network NW is also referred to as a GTP (GPRS (General Packet Radio Service) Tunneling Protocol) tunnel.

The user equipment UE can communicate with the Internet IN through a superior bearer (EPS bearer) including the data radio bearer DRB established between the user equipment UE and the first base station eNB, and an S1 bearer, and can communicate with the Internet IN through a superior bearer including the data radio bearer DRB established between the user equipment UE and the second base station PhNB, the X3 bearer X3B, and the S1 bearer.

Nodes in the radio communication system CS each have unique identification information. The identification information may include an IP address, a TEID (tunnel endpoint ID), a network address, etc., of each node. The identification information of the first base station eNB and the second base station PhNB may include a physical cell ID (Physical Cell ID) for identifying a cell C which the base station corresponding to the identification information forms. The IP address is an address value for uniquely identifying each node in the radio communication system CS. TEID is an identifier that identifies an endpoint of a GTP tunnel which logically connects nodes. The network address is, in a case in which the radio communication system CS is sectioned into multiple subnets, an address value identifying a subnet the node belongs to. Each node in the radio communication system CS identifies another node based on the identification information of the another node.

Figure 2:
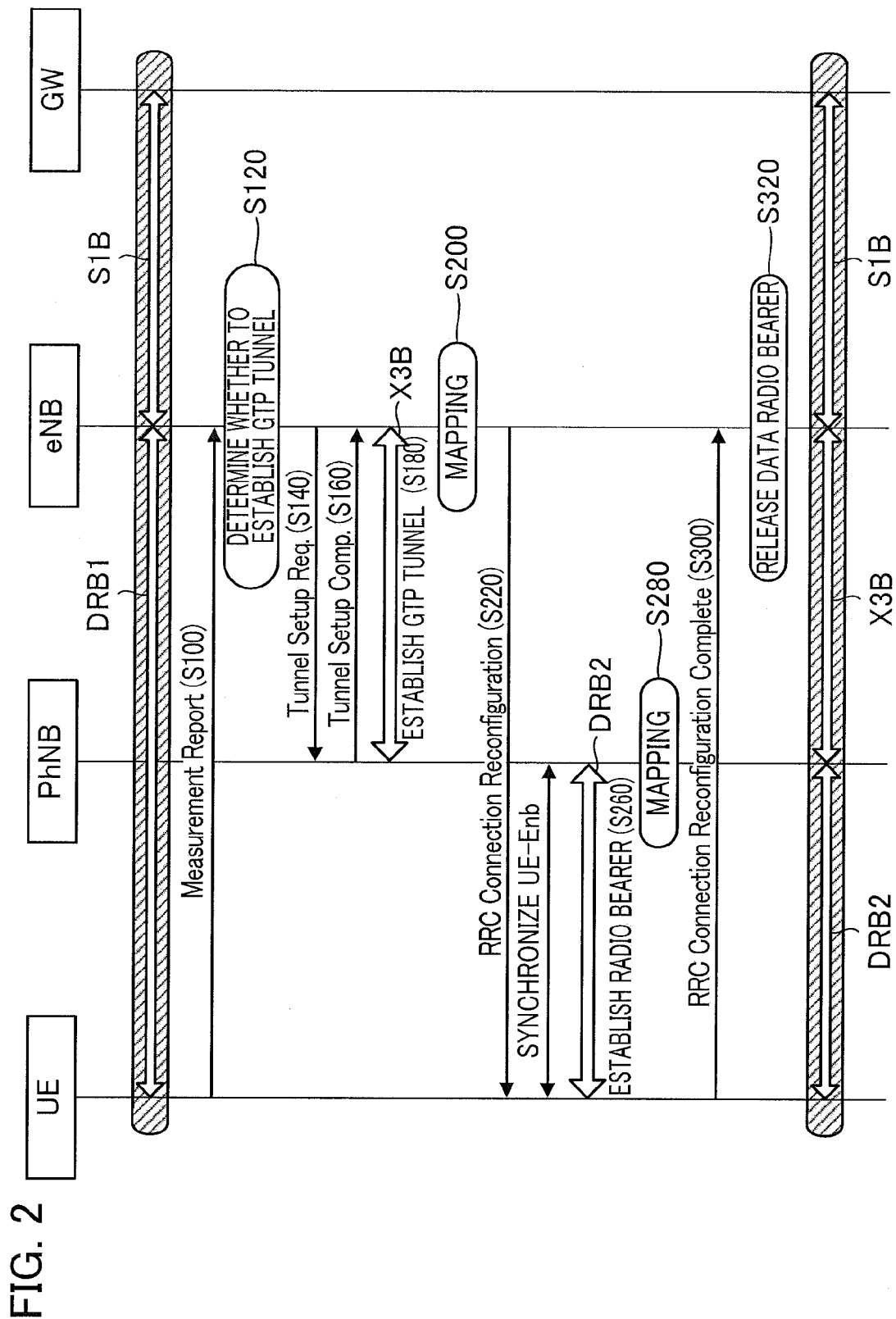
FIG. 2 is an explanatory diagram showing an example of a GTP tunnel establishment operation according to the first embodiment.
Figure 3:
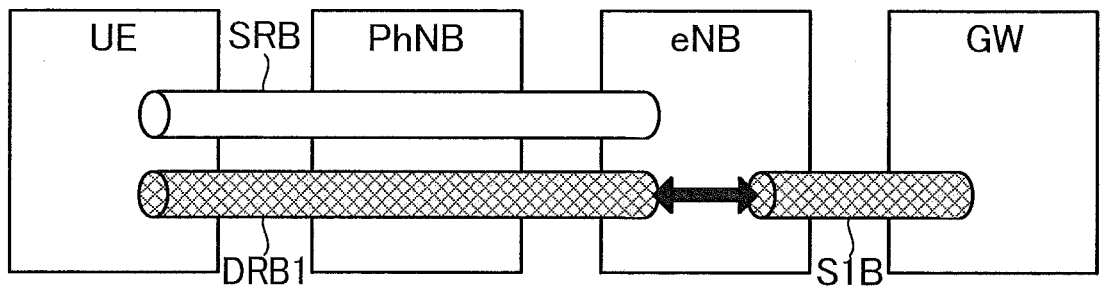
FIG. 3 is a diagram showing an example of a logical path configuration.

1(2). Establishment of GTP Tunnel Between First Base Station and Second Base Station Description will be given of an example operation of a GTP tunnel establishment according to the first embodiment, with reference to FIG. 2. In the example of FIG. 2, we assume that an S1 bearer S1B is established between the gateway device GW and the first base station eNB, and a data radio bearer DRB1 associated with the S1 bearer S1B is established between the first base station eNB and the user equipment UE (FIG. 3). Therefore, with the above assumption, in the beginning, the user equipment UE transmits and receives user signals only through the first base station eNB to which the user equipment UE is radio-connecting. As shown in FIG. 3, for the C-Plane, we assume that a signaling radio bearer SRB has been established between the user equipment UE and the first base station eNB in the beginning.

The user equipment UE measures reception power (reception quality) of radio waves which neighboring base stations transmit and reports to a first base station eNB to which the user equipment UE is radio-connecting. More specifically, the user equipment UE transmits, to the first base station eNB via a C-plane path (signaling radio bearer SRB), a Measurement Report message (measurement report message) containing information indicating the reception power (reception quality) of radio waves (reference signal) which neighboring base stations (eNB, PhNB) transmit (S100). In particular, in the present example, the Measurement Report message contains information indicating the reception power from the first base station eNB and information indicating the reception power from the second base station PhNB.

The first base station eNB, upon receiving the Measurement Report message transmitted from the user equipment UE, determines whether the user equipment UE should transmit and receive user signals via the second base station PhNB, i.e., whether to establish a U-plane path (GTP tunnel) between the first base station eNB and the second base station PhNB (S120). The above determination is performed based on a criterion such as, for example, "whether the reception power of radio waves from the second base station PhNB is greater than the reception power of radio waves from the first base station eNB to which the user equipment is currently connecting". In this example, we assume that the first base station eNB has determined that a U-plane path should be established between the first base station eNB and the second base station PhNB in Step S120 because the reception power from the second base station PhNB is greater than the reception power from the first base station eNB.

After the determination of Step S120, the first base station eNB transmits, to the second base station PhNB, a Tunnel Setup Request message (tunnel establishment request message) instructing to establish a U-plane path between the first base station eNB and the second base station PhNB (S140). The Tunnel Setup Request message includes identification information of the first base station eNB. The second base station PhNB, upon receiving the Tunnel Setup Request message, transmits, to the first base station eNB, a Tunnel Setup Complete message (tunnel establishment completion message) containing identification information of the second base station PhNB and access layer setting information (AS Config) after establishing a logical connection (upbound logical connection) with regard to the first base station eNB based on the identification information of the first base station eNB contained in the Tunnel Setup Request message (S160). The access layer setting information includes information such as timing information of a random access channel (Random Access Channel, RACH) necessary for the user equipment UE and the second base station PhNB to synchronize with each other. The first base station eNB, upon receiving the Tunnel Setup Complete message, establishes a logical connection (downlink logical connection) to the second base station PhNB based on the identification information of the second base station PhNB contained in the Tunnel Setup Complete message. As is described in the foregoing, the first base station eNB takes the initiative in establishing an x3 bearer X3B which is a U-plane path (GTP tunnel) between the first base station eNB and the second base station PhNB (S180).

Figure 4:
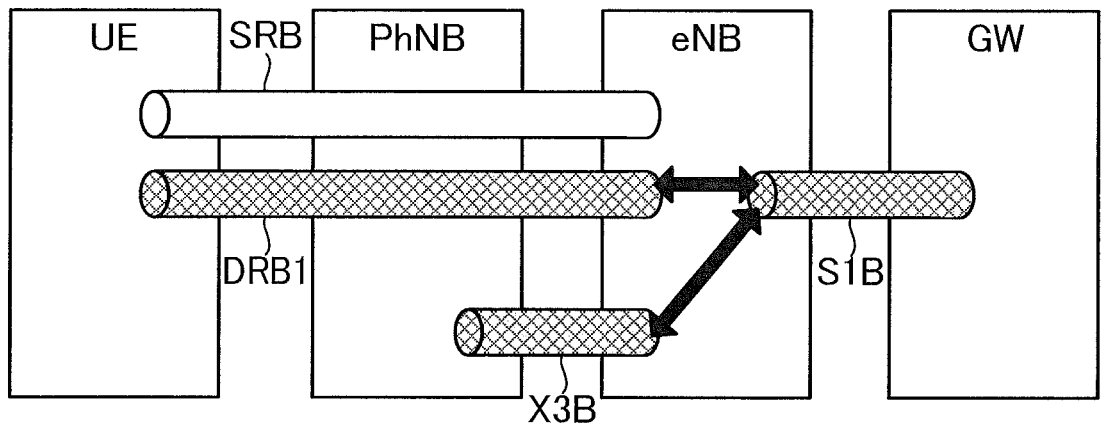
FIG. 4 is a diagram showing an example of a logical path configuration.

The first base station eNB associates (maps) the established U-plane path (X3 bearer X3B) with the S1 bearer S1B established between the gateway device GW and the first base station eNB (S200). FIG. 4 is a diagram showing a logical path after the mapping of Step S200, and shows a condition in which the X3 bearer X3B has been established in addition to the S1 bearer S1B, the signaling radio bearer SRB, and the data radio bearer DRB1 that was established in the beginning (FIG. 3).

When Step S200 is completed, the first base station eNB transmits, to the user equipment UE with which the first base station eNB is currently connecting, an RRC Connection Reconfiguration message (radio connection reconfiguration message) instructing establishment of a new data radio bearer DRB2 between the second base station PhNB and the user equipment UE (S220). The RRC Connection Reconfiguration message includes information (the identification information of the second base station PhNB and the access layer setting information) necessary for the user equipment UE to radio-connect to the second base station PhNB.

The user equipment UE establishes the data radio bearer DRB2 with respect to the second base station PhNB according to the received RRC Connection Reconfiguration message. More specifically, the user equipment UE accesses the second base station PhNB using the access layer setting information after having performed synchronization with the second base station PhNB based on the identification information of the second base station PhNB contained in the received RRC Connection Reconfiguration message (S240). The establishment of the new data radio bearer DRB2 is completed when the user equipment UE succeeds in accessing the second base station PhNB (S260). That is to say, the user equipment UE establishes the new data radio bearer DRB2 by accessing the second base station PhNB according to the RRC Connection Reconfiguration message.

Figure 5:
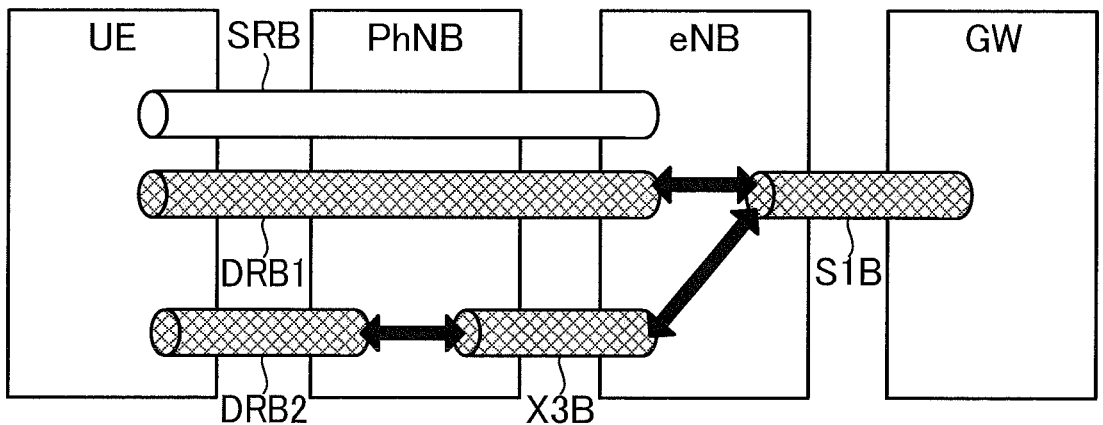
FIG. 5 is a diagram showing an example of a logical path configuration.

The second base station PhNB associates (maps) the newly established data radio bearer DRB2 with the X3 bearer X3B established between the first base station eNB and the second base station PhNB (S280). In this case, it is preferable that the second base station PhNB transmit a control signal indicating that the above mapping has been completed to at least one of the user equipment UE or the first base station eNB. FIG. 5 is a diagram showing a logical path after the mapping of Step S280, and shows a condition in which the user equipment UE and the gateway device GW are logically connected via the new data radio bearer DRB2, the X3 bearer X3B, and the S1 bearer S1B.

After Step S280, the user equipment UE transmits, to the first base station eNB, an RRC Connection Reconfiguration Complete message (radio connection reconfiguration completion message) indicating that the new data radio bearer DRB2 has been established (S300). Alternatively, the user equipment UE may transmit, to the first base station eNB, the RRC Connection Reconfiguration Complete message after the establishment (S260) of the new data radio bearer DRB2.

The first base station eNB can release the data radio bearer DRB1 that has been established between the user equipment UE and the first base station eNB (S320) after the newly established data radio bearer DRB2 is associated with the X3 bearer X3B (or after having received the RRC Connection Reconfiguration Complete message). It is to be noted that both the data radio bearer DRB1 may be maintained without Step S320 being performed. In either case, the signaling radio bearer SRB established between the user equipment UE and the first base station is maintained.

With the above-described operation, the GTP tunnel (X3 bearer X3B), which is a U-plane path between the first base station eNB and the second base station PhNB is established, and the new data radio bearer DRB2 between the second base station PhNB and the user equipment UE is established.

1(3). Configuration of Each Element

1(3)-1. Configuration of User Equipment

Figure 6:
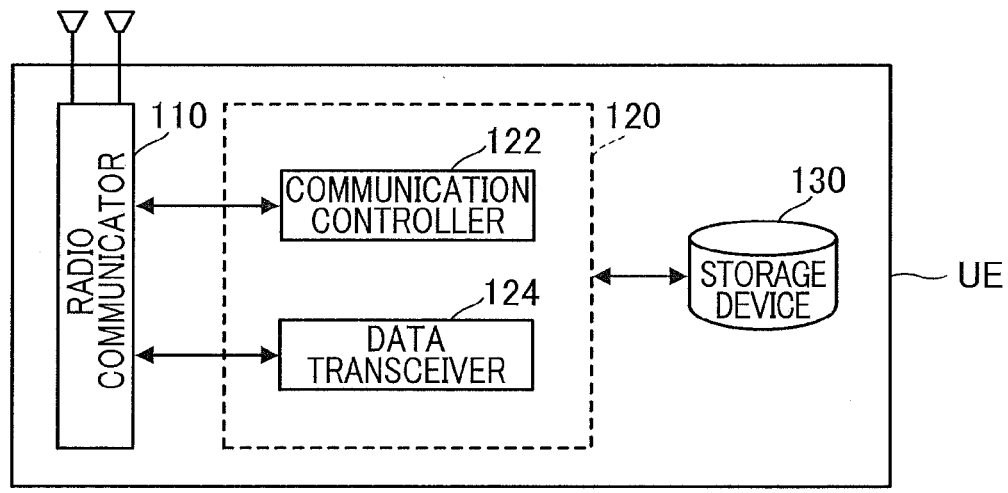
FIG. 6 is a block diagram showing a configuration of a user equipment according to the first embodiment.

FIG. 6 is a block diagram showing a configuration of the user equipment UE according to the first embodiment. The user equipment UE has a radio communicator 110, a controller 120, and a storage device 130. For the purpose of facilitating understanding, output devices for outputting sounds, images, etc., and input devices for accepting user instructions, are omitted.

The radio communicator 110 is an element for executing radio communication with the first base station eNB and the second base station PhNB, a transceiver antenna, a reception circuit for receiving radio signals (radio waves) and converting the signals into electrical signals, and a transmission circuit for converting electrical signals such as control signals, user signals, etc., into radio signals, for transmission. The storage device 130 stores information on communication control, identification information of each node including the user equipment UE itself, in particular, and context information of a communication path (C-plane path, U-plane path).

The controller 120 has a communication controller 122 and a data transceiver 124. The communication controller 122 is an element controlling radio communication between the user equipment UE and each base station (first base station eNB, second base station PhNB) and, using the Signaling bearer SRB, transmits and receives control signals (control messages) to and from each base station through the radio communicator 110. In other words, the communication controller 122 performs communication on the C-plane. For example, as described above, the communication controller 122 measures reception power of radio waves from neighboring base stations, to include information on the measured reception power in the Measurement Report message, and transmits the message to the first base station eNB. Furthermore, the communication controller 122 accesses the second base station PhNB based on the RRC Connection Reconfiguration message which the first base station eNB has transmitted, to establish the data radio bearer DRB2 between the user equipment UE and the second base station PhNB. On the other hand, the data transceiver 124 transmits and receives user signals via the radio communicator 110, to and from each base station, using the data radio bearer DRB. In other words, the data transceiver 124 performs communication on the U-plane.

The controller 120 and the communication controller 122 and the data transceiver 124 included in the controller 120 are functional blocks embodied by a CPU (Central Processing Unit, not shown) of the user equipment UE executing a computer program stored in the storage device 130 to function in accordance with the computer program.

1(3)-2. Configuration of First Base Station

Figure 7:
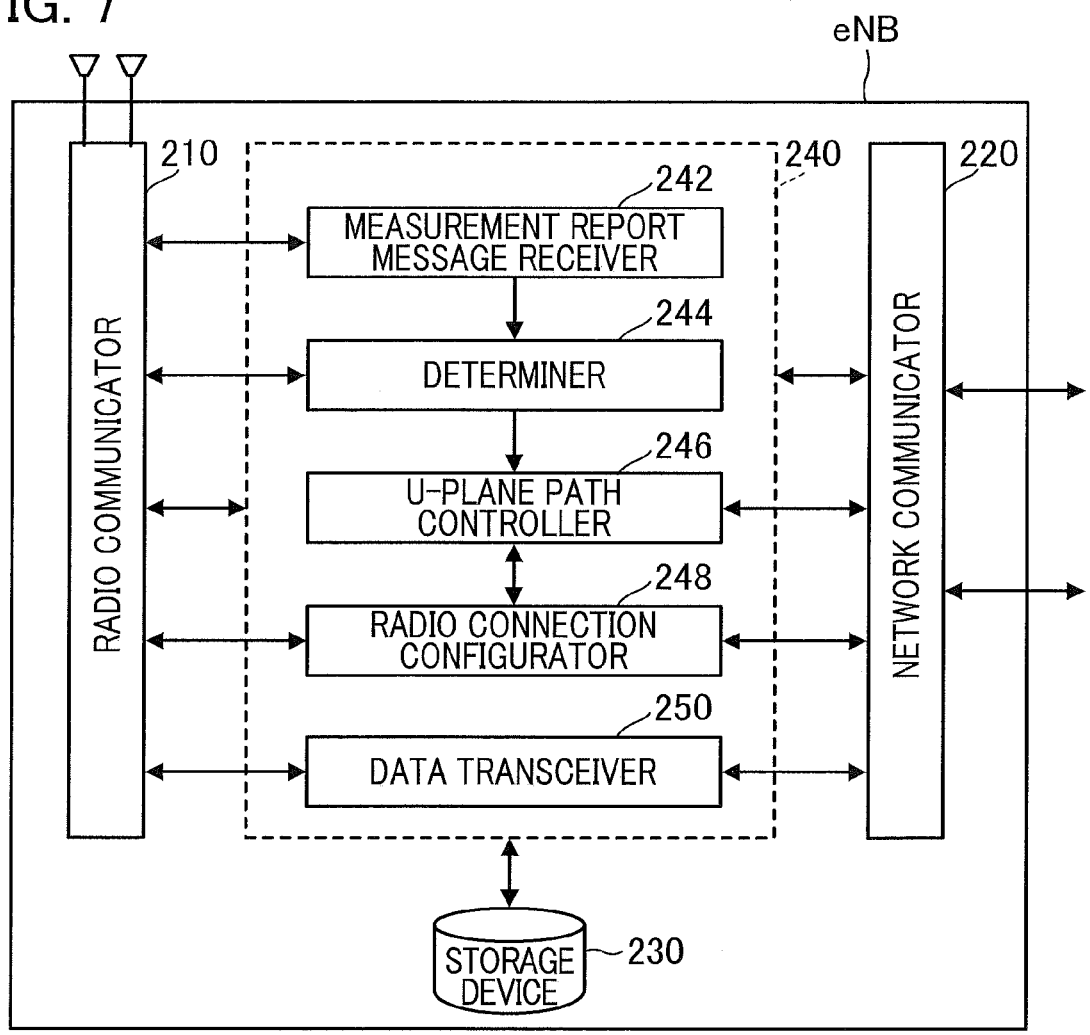
FIG. 7 is a block diagram showing a configuration of the first base station according to the first embodiment.

FIG. 7 is a block diagram showing a configuration of the first base station eNB of the first embodiment. The first base station eNB includes a radio communicator 210, a network communicator 220, a storage device 230, and a controller 240. The radio communicator 210 is an element for performing radio communication with the user equipment UE, and has a configuration similar to the radio communicator 110 of the user equipment UE. The network communicator 220 is an element for communicating with other nodes in the network NW (second base station PhNB, switching station MME, gateway device GW, etc.), and transmits and receives electrical signals to and from other nodes. The storage device 230 stores information on communication control, identification information of each node including the first base station itself, in particular, and context information of a communication path (C-plane path, U-plane path).

The controller 240 is an element that controls communication with other nodes such as the user equipment UE, the second base station PhNB, etc., and in particular, has a measurement report message receiver 242, a determiner 244, and a U-plane path controller 246, a radio connection configurator 248, and a data transceiver 250. In the following, as described above, the measurement report message receiver 242 receives a Measurement Report message transmitted by the user equipment UE through the radio communicator 210, for supply to the determiner 244. The determiner 244 performs determination as to whether to establish a U-plane path (GTP tunnel) in the above-mentioned Step S120. The U-plane path controller 246 controls establishment of a U-plane path (X3 bearer X3B, in particular) based on a determination of the determiner 244. Furthermore, the U-plane path controller 246 associates (maps) one U-plane path with another U-plane path. The radio connection configurator 248 transmits an RRC Connection Reconfiguration message using a C-plane path (signaling bearer SRB), thereby to execute radio resource control of user equipment UE (establishment, release, etc., of the radio bearer RB). The data transceiver 250 transmits and receives (relays) user signals to and from the user equipment UE via the data radio bearer DRB and transmits and receives (relays) user signals to and from the gateway device GW through the S1 bearer S1B. As is understood from the foregoing, the controller 240 executes communication on the C-plane and on the U-plane.

The controller 240 and the measurement report message receiver 242, the determiner 244, the U-plane path controller 246, the radio connection configurator 248, and the data transceiver 250 included in the controller 240 are functional blocks embodied by a CPU (not shown) of the first base station eNB executing a computer program stored in the storage device 230 to function in accordance with the computer program.

1(3)-3. Configuration of Second Base Station

Figure 8:
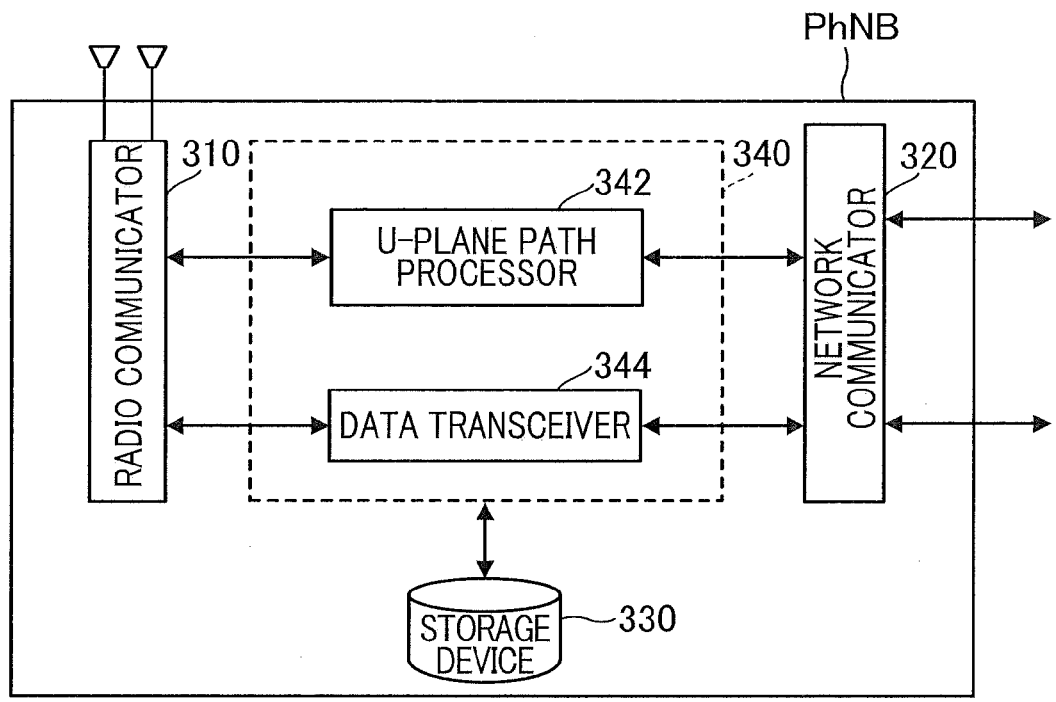
FIG. 8 is a block diagram showing a configuration of a second base station according to the first embodiment.

FIG. 8 is a block diagram showing a configuration of the second station PhNB of the first embodiment. The second station PhNB includes a radio communicator 310, a network communicator 320, a storage device 330, and a controller 340. The radio communicator 310 is an element for performing radio communication with the user equipment UE, and has a configuration similar to the radio communicator 210 of the first base station eNB. The network communicator 320 is an element for communicating with the first base station eNB, and transmits and receives electrical signals to and from the first base station eNB. The storage device 330 has information on communication control, identification information of each node including the second base station itself, in particular, and context information of a communication path (C-plane path, U-plane path).

The controller 340 has a U-Plane path processor 342 and a data transceiver 344. As described earlier, the U-plane path processor 342 transmits a Tunnel Setup Complete message to the first base station eNB after establishing a logical connection with the first base station eNB in response to control by the first base station eNB (Tunnel Setup Request message). Furthermore, the U-plane path processor 342 associates (maps) a U-plane path with another U-plane path. It is to be noted that the controller 340 does not perform radio resource control of the user equipment UE.

The data transceiver 344 transmits and receives (relays) user signals to and from the user equipment UE via the data radio bearer DRB and transmits and receives (relays) user signals to and from the gateway device GW via the X3 bearer X3B and the S1 bearer S1B (i.e., via the first base station eNB). In other words, the data transceiver 344 performs communication on the U-plane.

The controller 340 and the U-Plane path processor 342 and the data transceiver 344 included in the controller 340 are functional blocks embodied by a CPU (not shown) of the second base station PhNB executing a computer program stored in the storage device 330 to function in accordance with the computer program.

1(3)-4. Configuration of Switching Station

Figure 9:
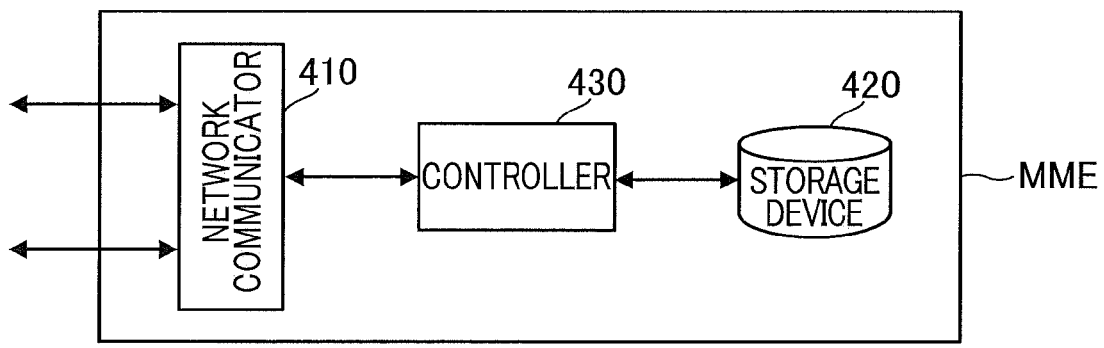
FIG. 9 is a block diagram showing a configuration of a switching station according to the first embodiment.

FIG. 9 is a block diagram showing a configuration of the switching station MME according to the first embodiment. The switching station MME includes a network communicator 410, a storage device 420, and a controller 430. The network communicator 410 is an element for performing communication with other nodes in the network NW (gateway GW, first base station eNB, etc.), and has a configuration similar to the network communicator 220 of the first base station eNB. The storage device 420 stores information on communication control, identification information of each node including the switching station itself, in particular, and context information of a communication path (C-plane path, U-plane path). The communication controller 430 is a communication controller for performing communication control of the radio communication system CS and transmits and receives control signals to and from other nodes. As is understood from the foregoing, the switching station MME (controller 430) executes communication on the C-plane and does not execute communication on the U-plane.

The controller 430 is a functional block embodied by a CPU (Central Processing Unit, not shown) of the switching station MME executing a computer program stored in the storage device 420 to function in accordance with the computer program.

1(3)-5. Configuration of Gateway Device

Figure 10:
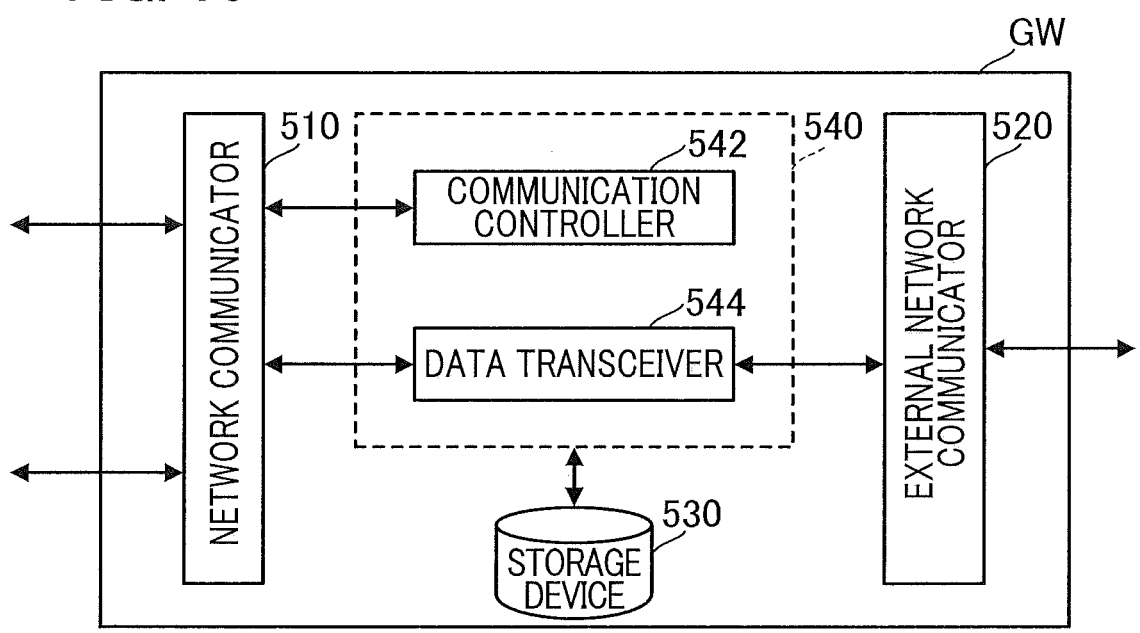
FIG. 10 is a block diagram showing a configuration of a gateway device according to the first embodiment.

FIG. 10 is a block diagram showing a configuration of the gateway GW of the first embodiment. The gateway GW includes a network communicator 510, an external network communicator 520, a storage device 530, and a controller 540. The network communicator 510 is an element for performing communication with other nodes in the network NW (first base station eNB, switching station MATE, etc.), and has a configuration similar to the network communicator 220 of the first base station eNB. The external network communicator 520 is an element for performing communication with the Internet IN and performs protocol conversion of user signals as needed. The storage device 530 stores information on communication control, identification information of each node including the gateway device itself, in particular, and context information of a communication path (C-plane path, U-plane path).

The controller 540 has a communication controller 542 and a data transceiver 544. The communication controller 542 is an element for performing communication control of the radio communication system CS and transmits and receives control signals to and from the switching station MME through the network communicator 510. In other words, the communication controller 542 performs communication on the C-plane through the network communicator 510. The data transceiver 544 transmits (relays) user signals to the Internet IN (an external server in the Internet IN) through the external network communicator 520, the user signals being received through the network communicator 510 from the user equipment UE as the sender. The data transceiver 544 also transmits (relays) user signals received through the external network communicator 520 from the Internet IN (an external server in the Internet IN), to the user equipment UE through the network communicator 510. In other words, the data transceiver 524 performs communication on the U-plane.

The controller 540 and the communication controller 542 and the data transceiver 544 included in the controller 540 are functional blocks embodied by a CPU (not shown) of the gateway device GW executing a computer program stored in the storage device 530 to function in accordance with the computer program.

1(4). Effects of the Present Embodiment

According to the above-described first embodiment, the GTP tunnel (X3 bearer X3B), which is a U-plane path between the first base station eNB and the second base station PhNB, is established, and the data radio bearer DRB2, which is a U-plane path, is established between the user equipment UE and the second base station PhNB, which does not have a C-plane path to the user equipment UE. Accordingly, the user equipment UE is enabled to transmit and receive user signals via the second base station PhNB, which is not connected directly with the gateway device GW. That is to say, the radio communication system CS provided with the second base station PhNB not performing radio resource control of the user equipment UE (i.e., having limited control functions) is realized.

Second Embodiment

The second embodiment of the present invention is described below. In each mode illustrated below, for elements for which action and function are the same as those of the first embodiment, the reference numerals used in the foregoing description will also be used, and description thereof will be omitted as appropriate.

In the first embodiment, a U-plane path is established between the first base station eNB and the second base station PhNB. In the second embodiment, a U-plane path established between the first base station eNB and the second base station PhNB can be released.

2(1). Releasing GTP Tunnel Between First Base Station and Second Base Station

Figure 11:
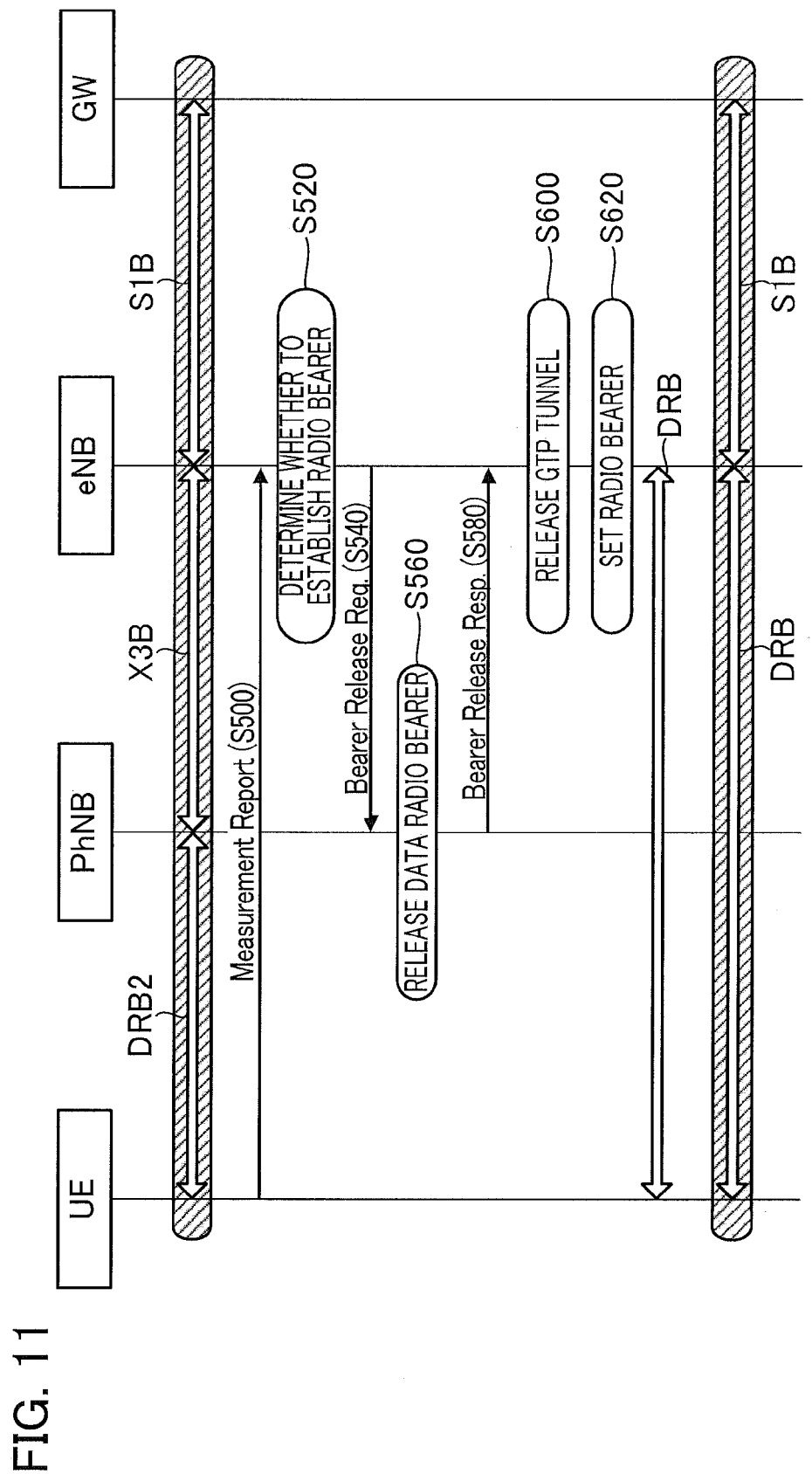
FIG. 11 is a diagram illustrating an example of a GTP tunnel release operation according to the second embodiment.
Figure 12:
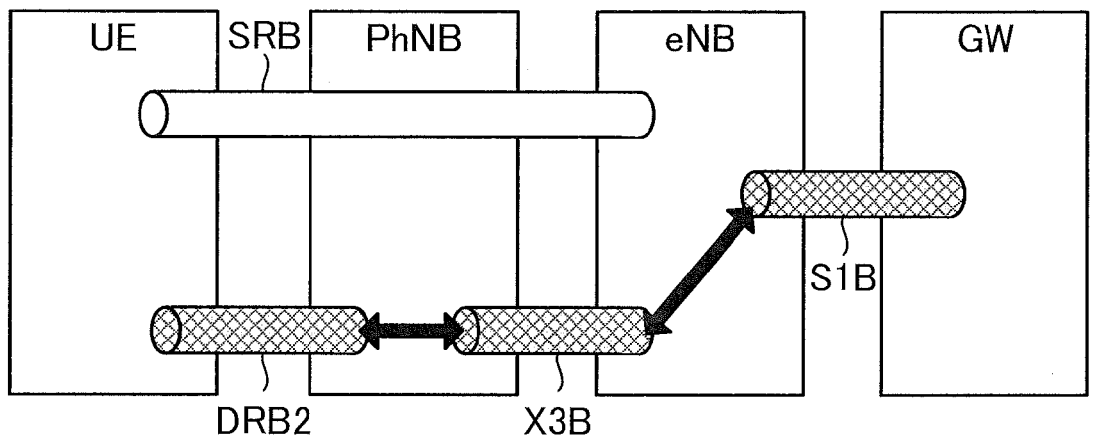
FIG. 12 is a diagram showing an example of a logical path configuration.

Description will be given of an example operation of releasing a GTP tunnel according to the second embodiment, with reference to FIG. 11. In the example of FIG. 11, in the beginning, we assume that the S1 bearer S1B is established between the gateway device GW and the first base station eNB, that the X3 bearer X3B associated with the S1 bearer S1B is established between the first base station eNB and the second base station PhNB, and that the data radio bearer DRB2 associated with the X3 bearer X3B is established between the second base station PhNB and the user equipment UE (FIG. 12). That is to say, it can be said that the example of FIG. 11 is a state in which, after a GTP tunnel was established between the first base station eNB and the second base station PhNB in the first embodiment, the data radio bearer DRB1 that had been established between the user equipment UE and the first base station eNB was released. Therefore, with the above assumption, in the beginning, the user equipment UE transmits and receives user signals only through the second base station PhNB to which the user equipment HE is radio-connecting. Furthermore, as shown in FIG. 12, for the C-Plane, we assume that a signaling radio bearer SRB has been established between the user equipment UE and the first base station eNB in the beginning.

The user equipment UE, similarly to the first embodiment, transmits, to the first base station eNB through the C-plane path, a Measurement Report message containing information indicating the reception power (reception quality) of radio waves (reference signal) that the neighboring base stations (eNB, PhNB) transmit (S500). The first base station eNB (determiner 244), upon receiving the Measurement Report message transmitted from the user equipment UE, determines whether to establish a U-plane path (data radio bearer DRB1) between the user equipment UE and the first base station eNB (in its turn, whether to release a U-plane path (GTP tunnel) between the first base station eNB and the second base station PhNB) (S520). The above determination is executed based on, for example, the same criterion as that of the first embodiment. In this example, we assume that the first base station eNB (determiner 244) has determined that the data radio bearer DRB1 should be established between the user equipment UE and the first base station eNB in Step S520 because the reception power from the first base station eNB is greater than the reception power from the second base station PhNB.

After the determination of Step S520, the first base station eNB (U-plane path controller 246) transmits, to the second base station PhNB, a Bearer Release Request message (bearer release request message) instructing to release the data radio bearer DRB2 currently being established between the user equipment UE and the second base station PhNB (S540). The second base station PhNB (U-Plane path processor 342) releases the data radio bearer DRB2 currently being established based on the received Bearer Release Request message (S560). The association between the data radio bearer DRB2 and the X3 bearer X3B is dissolved (disassociated) when the data radio bearer DRB2 is released. After the determination of Step S560, the second base station PhNB (U-Plane path processor 342) transmits, to the first base station eNB, a Bearer Release Response message (bearer release response message) indicating that the data radio bearer DRB2 has been released (S580). The first base station eNB (U-plane path controller 246), upon receiving the Bearer Release Response message, releases the X3 bearer X3B (GTP tunnel) (S600). When the X3 bearer X3B is released, the association between the X3 bearer X3B and the S1 bearer S1B is dissolved.

Figure 13:
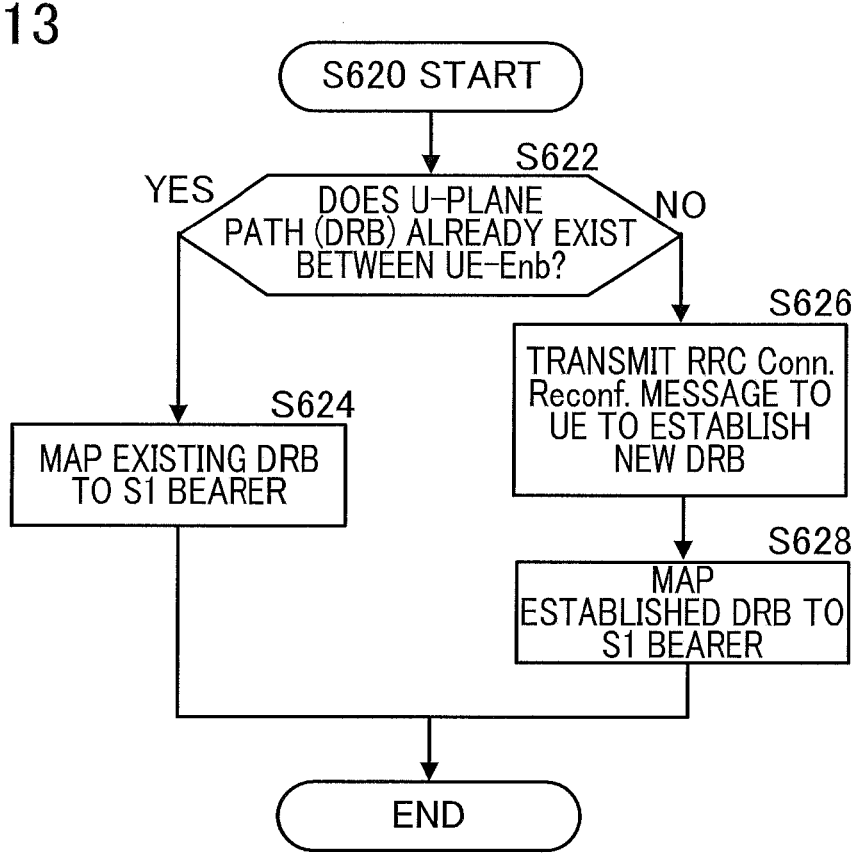
FIG. 13 is a flowchart showing an example of a data radio bearer configuration operation.

After the GTP tunnel is released in Step S600, the first base station eNB sets (establishes) a data radio bearer DRB1 between the user equipment UE and the first base station eNB (S620). Specifically, as shown in FIG. 13, the U-plane path controller 246 of the first base station eNB determines whether a U-plane path (data radio bearer DRB) already exists between the user equipment UE and the first base station eNB (S622). In a case in which the data radio bearer DRB exists (S622:YES), the first base station eNB associates the existing data radio bearer DRB with the S1 bearer S1B established between the gateway device GW and the first base station eNB (S624). On the other hand, in a case in which the data radio bearer DRB does not exist (S622: NO), the U-plane path controller 246 of the first base station eNB controls the radio connection configurator 248 to cause the user equipment UE to transmit an RRC Connection Reconfiguration message instructing to establish a new data radio bearer DRB between the user equipment UE and the first base station eNB (S626). The U-plane path controller 246 associates (maps) the newly established data radio bearer DRB with the S1 bearer S1B (S628). In Step S620, the data radio bearer DRB1 is established between the user equipment UE and the first base station eNB.

2(2). Modification of Second Embodiment

In the configuration of the above second embodiment, an operation from Step S540 to Step S600 (releasing of the data radio bearer DRB2 and the X3 bearer X3B) may be skipped. That is to say, the data radio bearer DRB1 between the user equipment UE and the first base station eNB may be set while the data radio bearer DRB2 and the X3 bearer X3B already existing being maintained.

2(3). Effects of the Present Embodiment

According to the above-described second embodiment, the GTP tunnel (X3 bearer X3B), which is a U-plane path established between the first base station eNB and the second base station PhNB, is released, and the data radio bearer DRB1 is established between the user equipment UE and the first base station eNB. Therefore, the user equipment UE which was executing radio communication via the second base station PhNB is enabled to transmit and receive user signals via the first base station eNB. That is to say, the radio communication system CS provided with the second base station PhNB not performing radio resource control of the user equipment UE (i.e., having limited control functions) is realized.

Third Embodiment

In the above-described embodiment, the first base station eNB has a determiner that determines whether to establish and release a U-plane path. In the third embodiment, the switching station MME is provided with the determiner such as above.

3(1)-1. Configuration of First Base Station

Figure 14:
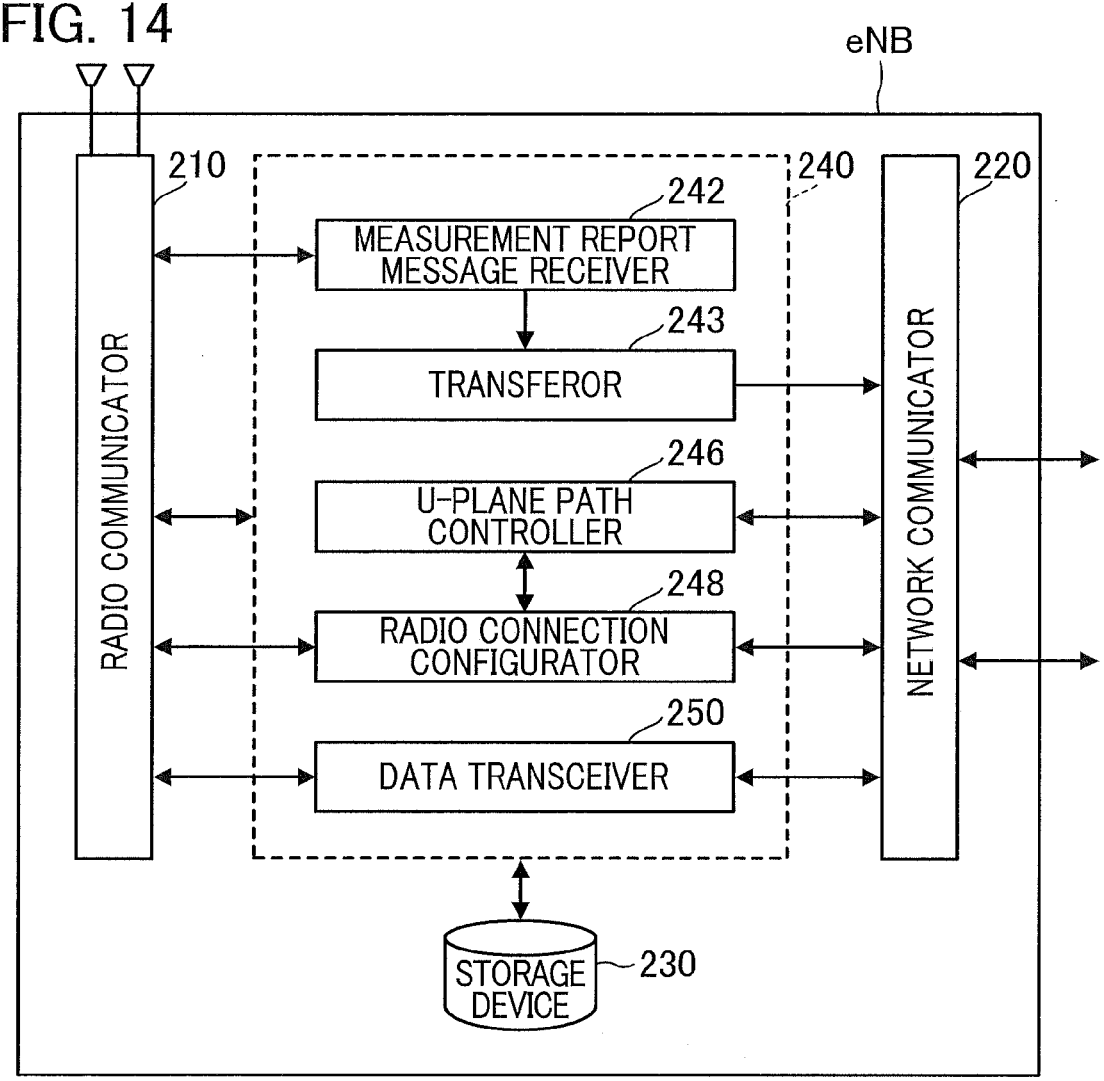
FIG. 14 is a block diagram showing a configuration of the first base station according to a third embodiment.

FIG. 14 is a block diagram showing a configuration of the first base station eNB of the third embodiment. A transferor 243 of the first base station eNB (controller 240) is a function block that transfers, to the switching station via the network communicator 220, a Measurement Report message received by the measurement report message receiver 242. It is to be noted that the controller 240 of the first base station eNB does not have the determiner 244.

3(1)-2. Configuration of Switching Station

Figure 15:
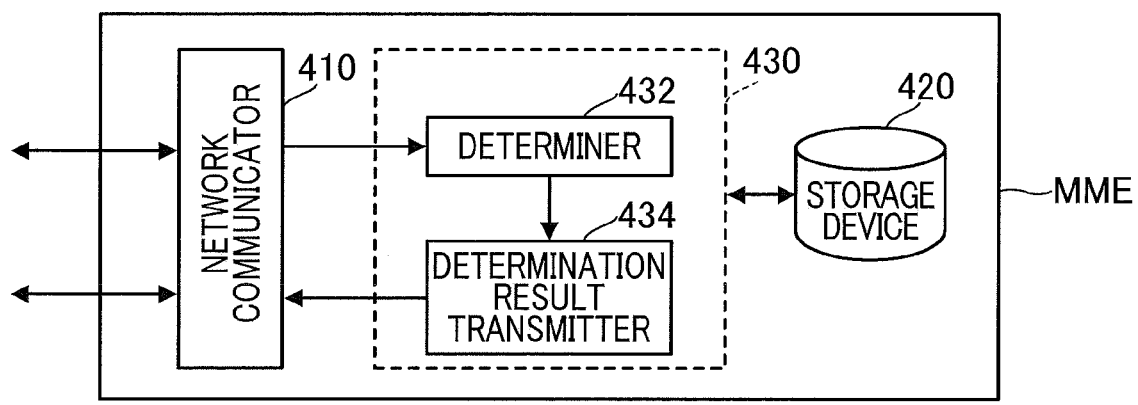
FIG. 15 is a block diagram showing a configuration of a switching station according to the third embodiment.

FIG. 15 is a block diagram showing a configuration of the switching station MIME according to the third embodiment. The controller 430 of the switching station MME is provided with a determiner 432 and a determination result transmitter 434. The determiner 432 is a functional block that is similar to the determiner 244 of the first base station eNB of the first and second embodiments. The determiner 432 determines whether to establish the X3 bearer X3B between the first base station eNB and the second base station PhNB based on the Measurement Report message transferred from the first base station eNB. Furthermore, the determiner 432 determines whether to establish the data radio bearer DRB1 between the user equipment UE and the first base station eNB based on the Measurement Report message transferred from the first base station eNB. The determination result transmitter 434 is a function block that transmits a determination result based on the above determiner 432 to the first base station eNB (U-plane path controller 246) via the network communicator 410.

Figure 16:
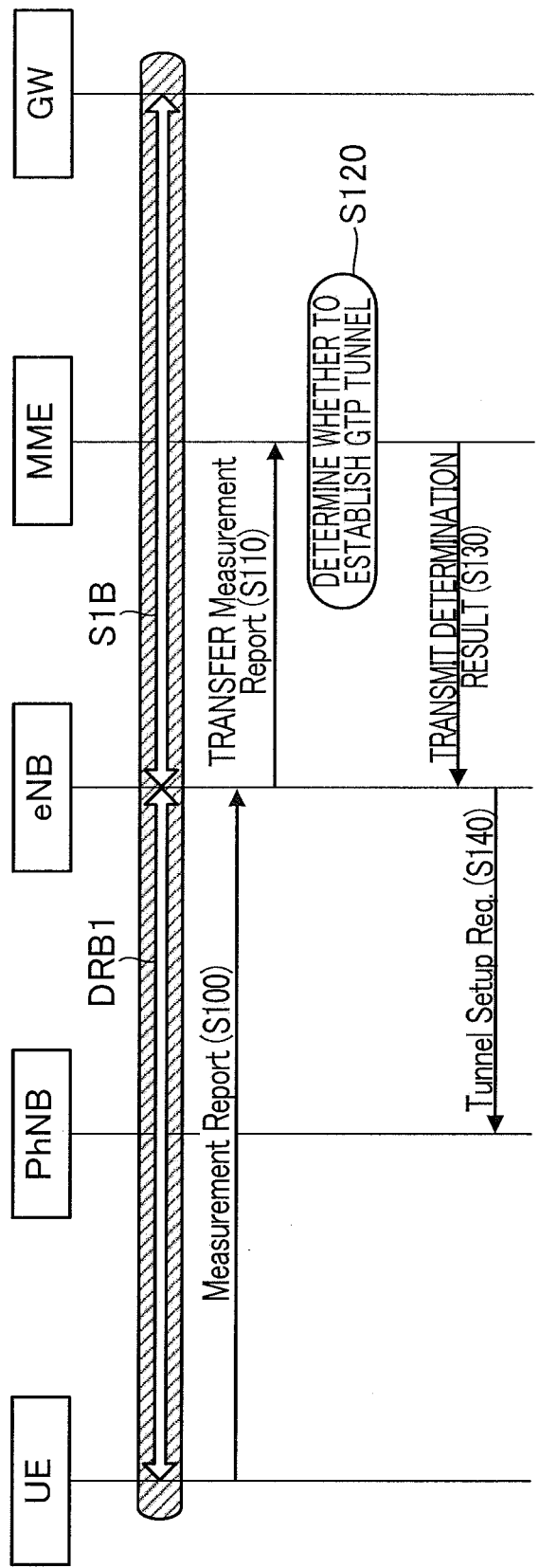
FIG. 16 is a diagram showing an example of a GTP tunnel establishment operation according to the third embodiment.

3(2). Establishment of GTP Tunnel Between First Base Station and Second Base Station Description will be given of an example operation of establishing a GTP tunnel according to the third embodiment, with reference to FIG. 16. The assumptions in the beginning of the operation are the same as those of the first embodiment (FIG. 3, in particular). The user equipment UE, similarly to the first embodiment, transmits a Measurement Report message to the first base station eNB (S100). The first base station eNB, upon receiving the Measurement Report message transmitted from the user equipment UE, transfers the message to the switching station MME (S110). The switching station MME (the determiner 432), upon receiving the Measurement Report message transferred from the first base station eNB, determines, similarly to the first base station eNB of the first embodiment, whether the user equipment UE should transmit and receive user signals via the second base station PhNB, i.e., whether to establish a U-plane path (GTP tunnel) between the first base station eNB and the second base station PhNB (S120). The switching station MME (determination result transmitter 434) transmits a determination result in Step S120 to the first base station eNB (S130). In this example, we assume that the above determination result indicates that a U-plane path should be established between the first base station eNB and the second base station PhNB. The first base station eNB (U-plane path controller 246) transmits a Tunnel Setup Request message to the second base station PhNB based on the received determination result (S140). The operation that follows is the same as that of the first embodiment (FIG. 2).

Figure 17:
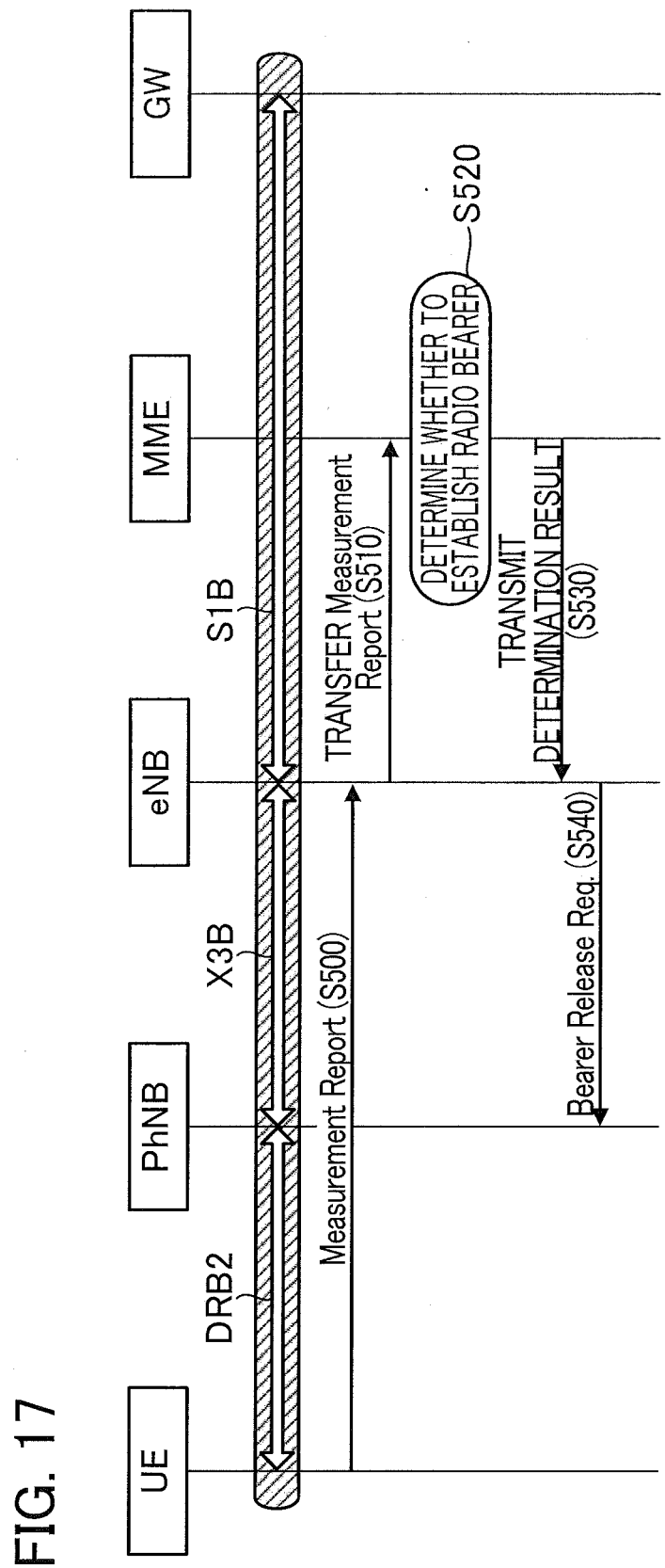
FIG. 17 is a diagram illustrating an example of a GTP tunnel release operation according to the third embodiment.

3(3). Releasing GTP Tunnel Between First Base Station and Second Base Station Description will be given of an example operation of releasing the GTP tunnel according to the third embodiment, with reference to FIG. 17. The assumptions in the beginning of the operation are the same as those of the second embodiment (FIG. 12, in particular). The user equipment UE, similarly to the second embodiment, transmits a Measurement Report message to the first base station eNB (S500). The first base station eNB, upon receiving the Measurement Report message transmitted from the user equipment UE, transfers the message to the switching station MIME (S510). The switching station MME (determiner 432), upon receiving the Measurement Report message transferred from the first base station eNB, determines, similarly to the first base station eNB of the second embodiment, whether to establish a U-plane path between the user equipment UE and the first base station eNB (in its turn, whether to release a U-plane path between the first base station eNB and the second base station PhNB) (S520). The switching station MIME (determination result transmitter 434) transmits a determination result in Step S520 to the first base station eNB (S530). In this example, we assume that the above determination result indi-cates that a data radio bearer DRB1 should be established between the user equipment UE and the first base station eNB. The first base station eNB (U-plane path controller 246) transmits a Bearer Release Request message to the second base station PhNB based on the received determination result (S540). The operation that follows is the same as that of the second embodiment (FIG. 11). Similarly to the above second embodiment, an operation from Step S540 to Step S600 (releasing of the data radio bearer DRB2 and the X3 bearer X3B) may be skipped.

3(4). Effects of Third Embodiment

According to the third embodiment described above, the same actions and effects as the first and the second embodiments can be attained. Furthermore, the processing load at the first base station eNB is reduced in comparison with a configuration in which the first base station eNB performs the determination because the switching station MME determines whether to establish or release a U-plane path.

MODIFICATIONS

Various modifications may be applied to the above-described embodiment. Specific modifications are exemplified below. Two or more modifications selected from among the above embodiments and the following may be combined.

4(1). Modification 1

Figure 18:
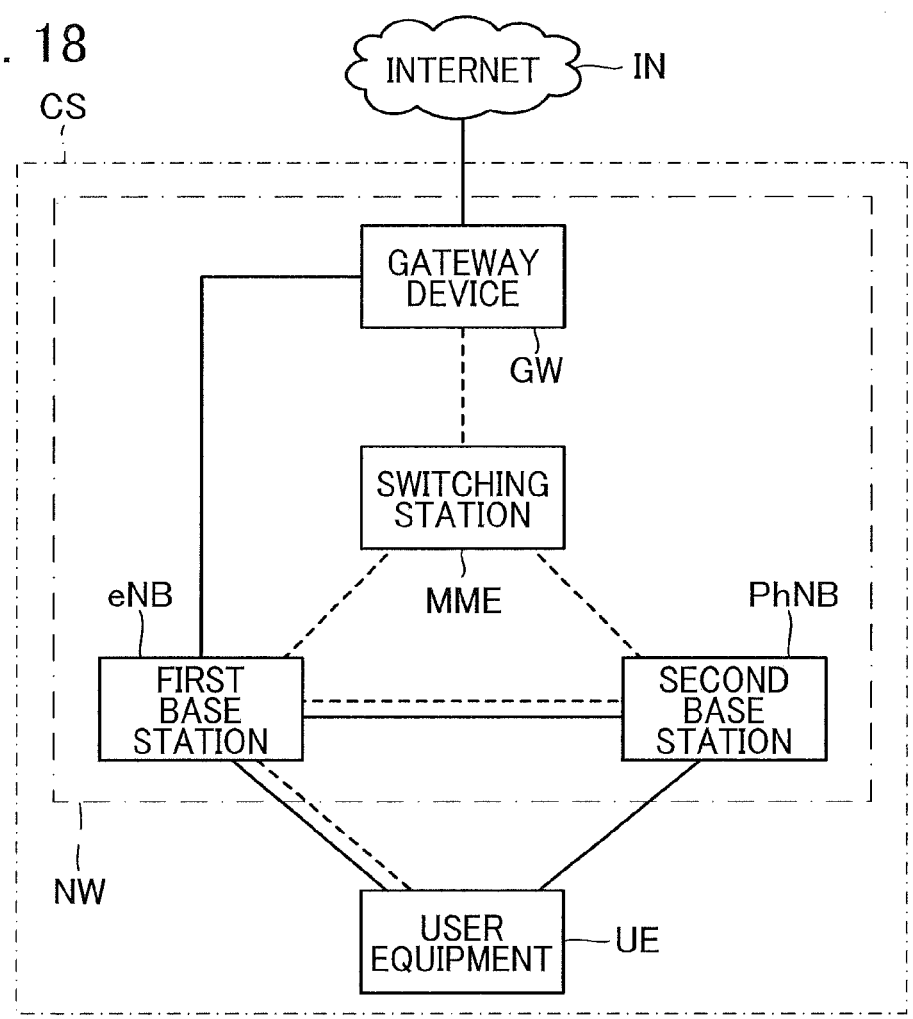
FIG. 18 is a block diagram showing a radio communication system according to a modification.

In the above-described embodiments, the switching station MME and the second base station PhNB are not directly connected with each other. However, as shown in FIG. 18, a configuration in which a C-plane interface (S1-MME interface) exists between the switching station MME and the second base station PhNB can be adopted. Furthermore, a configuration can be adopted in which, from among plural second base stations PhNB included in the radio communication system CS, some second base stations PhNB do not connect to the switching station MME as in FIG. 1, but some other second base stations PhNB connect to the switching station MME as in FIG. 2.

4(2). Modification 2

In the above embodiment, it is described as if the gateway device GW were a single device. However, the gateway device GW may be comprised of plural devices, for example, a serving gateway (Serving Gateway) and a PDN gateway (Packet Data Network Gateway) provided in the LTE/SAE standard.

4(3). Modification 3

Figure 19:
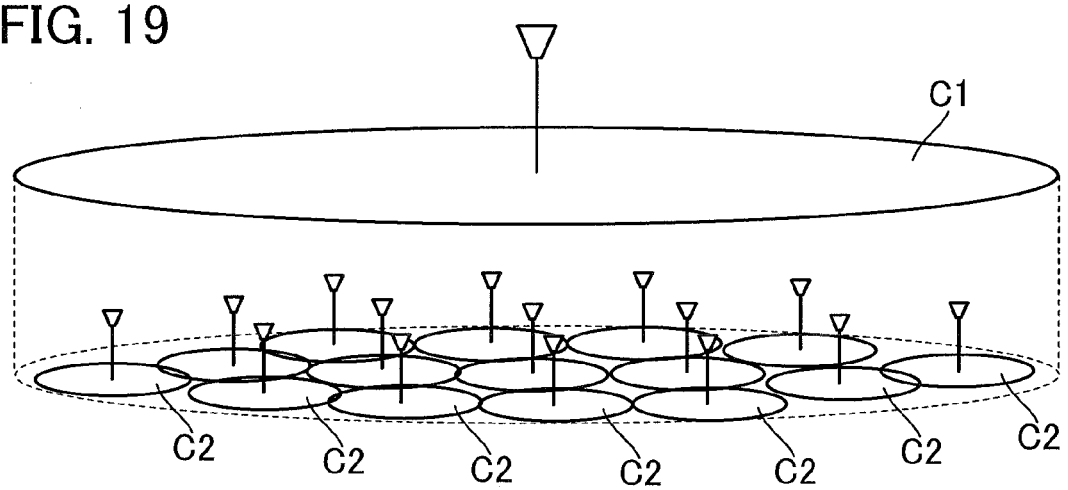
FIG. 19 is an explanation diagram showing a configuration of cells formed by each radio base station.

In the above-described embodiment, the size of cell C (the range in which radio waves arrive effectively) which each base station forms therearound can be freely selected. For example, a configuration can be employed in which the radio transmission ability (average transmitted power, maximum transmitted power, etc.) of the first base station eNB is greater than the radio transmission ability of the second base station PhNB and in which the size of a cell (macro cell C1) the first base station eNB forms is larger than the size of a cell (small cell C2) the second base station PhNB forms. In the above-described configuration, for example, as shown in FIG. 19, it is preferable that the small cells C2 be formed in a multilayered manner (overlaid) inside the macro cell C1 (for convenience of diagramming, a plane in which the macro cell C1 is shown is different from a plane in which the small cells C2 are shown; however, in actuality, the macro cell C1 and the small cells C2 are superimposed in the identical plane (the surface of the Earth or the like). On the other hand, a configuration can be employed in which the first base station eNB and the second base station PhNB form cells of the approximately the same size.

4(4). Modification 4

A configuration can be adopted in which a frequency band of radio waves that the first base station eNB transmits differs from a frequency band of radio waves that the second base station PhNB transmits. For example, we assume a configuration in which the first base station eNB performs radio communication using the first frequency band (e.g., 2 GHz band) and the second base station PhNB performs radio communication using the second frequency band (e.g., 3.5 GHz band) that is higher than the first frequency band. The higher the frequency is, the larger the propagation loss becomes. Therefore, the radio communication using the first frequency band is higher in stability than the radio communication using the second frequency band, in many cases. As described in the above embodiments, the first base station eNB performs transmission and reception (communication in C-Plane) of control signals (control messages) to and from the user equipment UE. Therefore, when the configuration of this modification is employed, since transmission and reception (communication in C-Plane) of control signals is performed in the first frequency band, which is more stable, the user equipment UE can be controlled with a greater degree of certainty.

4(5). Modification

In the above-described embodiment, the second base station PhNB does not transmit and receive control signals to and from the user equipment UE. However, a configuration can be adopted in which the second base station PhNB can transmit and receive control signals of a subordinate layer (e.g., L1 layer, L2 layer). Also in this configuration, the second base station PhNB does not transmit or receive signals related to radio resource control (control signals of an RRC layer).

4(6). Modification 6

The user equipment UE is capable of communicating by radio with the first base station eNB and the second base station PhNB. The user equipment UE may be a cell phone terminal, e.g., a feature phone or a smart phone, a desk-top type personal computer, a laptop personal computer, a UMPC (ultra-mobile personal computer), a portable game machine, or another radio terminal.

4(7). Modification 7

In each of the elements in the radio communication system CS (the user equipment UE, the first base station eNB, the second base station PhNB, the switching station MIME, the gateway device GW), functions executed by the CPU may be executed instead by hardware or by a programmable logic device, such as an FPGA (Field Programmable Gate Array) or a DSP (Digital Signal Processor).

REFERENCE SYMBOLS

UE . . . user equipment, 110 . . . radio communicator, 120 . . . controller, 122 . . . communication controller, 124 . . . data transceiver, 130 . . . storage device, eNB . . . . first base station, 210 . . . radio communicator, 220 . . . network communicator, 230 . . . storage device, 240 . . . controller, 242 . . . measurement report message receiver, 243 . . . transferor, 244 . . . determiner, 246 . . . U-plane path controller, 248 . . . radio connection configurator, 250 . . . data transceiver, PhNB . . . second base station, 310 . . . radio communicator, 320 . . . network communicator, 330 . . . storage device, 340 . . . controller, 342 . . . U-plane path processor, 344 . . . . data transceiver, MME . . . switching station, 410 . . . network communicator, 420 . . . storage device, 430 . . . controller, 432 . . . determiner, 434 . . . determination result transmitter, GW . . . gateway device, 510 . . . network communicator, 520 . . . external network communicator, 524 . . . data transceiver, 530 . . . storage device, 540 . . . controller, 542 . . . communication controller, 544 . . . data transceiver, C (C1, C2) . . . cell, CS . . . radio communication system, DRB . . . data radio bearer, IN . . . the Internet, NW . . . network, RB . . . . radio bearer, S1B . . . S1 bearer, SRB . . . Signaling bearer, X3B . . . X3 bearer.

The invention claimed is:

1. A radio communication system comprising:
a user equipment;
plural base stations; and
a gateway device,
the plural base stations including:
a first base station that executes, via a control-plane path, radio resource control of the user equipment; and
a second base station that does not execute radio resource control of the user equipment,
the first base station comprising:
a measurement report message receiver configured to receive a measurement report message regarding radio waves transmitted from the base stations, the message being transmitted from the user equipment;
a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device;
a user-plane path controller configured to, when the determiner determines to establish the third user-plane path, establish the third user-plane path between the first base station and the second base station, and to associate the established third user-plane path with the second user-plane path; and
a radio connection configurator configured to transmit, to the user equipment, a radio connection reconfiguration message instructing the user equipment to establish a fourth user-plane path between the user equipment and the second base station, and
the second base station comprising:
a user-plane path processor configured to associate the fourth user-plane path established by the user equipment with the third user-plane path.

2. A radio communication system comprising:
a user equipment;
plural base stations;
a switching station; and
a gateway device,
the plural base stations including:
a first base station that executes, via a control-plane path, radio resource control of the user equipment; and a second base station that does not execute radio resource control of the user equipment, the first base station comprising:
  a measurement report message receiver configured to receive a measurement report message regarding radio waves from the base stations, the message being transmitted from the user equipment; and
  a transferor configured to transfer the measurement report message to the switching station, the switching station comprising:
  a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device; and
  a determination result transmitter configured to transmit a determination result of the determiner to the first base station, the first base station further comprising:
  a user-plane path controller configured to, when the determination result indicates a determination that the third user-plane path is to be established, establish the third user-plane path between the first base station and the second base station, and to associate the established third user-plane path with the second user-plane path; and
  a radio connection configurator configured to transmit, to the user equipment, a radio connection reconfiguration message instructing to establish a fourth user-plane path between the user equipment and the second base station, and the second base station comprising:
  a user-plane path processor configured to associate the fourth user-plane path established by the user equipment with the third user-plane path.

3. A radio communication system according to claim 1,
wherein the user-plane path controller of the first base station releases the first user-plane path after the third user-plane path and the fourth user-plane path are associated.

4. A radio communication system according to claim 1,
wherein the user-plane path controller of the first base station transmits, to a second base station, a path establishment request message including identification information of the first base station and requiring establishment of the third user-plane path,
wherein the user-plane path processor of the second base station transmits a path establishment response message containing identification information of the second base station in response to the path establishment request message,
wherein the radio connection configurator of the first base station transmits, to the user equipment, the radio connection reconfiguration message containing the identification information of the second base station, and the user equipment comprising:
  a communication controller configured to establish the fourth user-plane path based on the radio connection reconfiguration message by accessing the second base station.

5. A radio communication system comprising:
a user equipment;
plural base stations; and
a gateway device, the plural base stations including:
  a first base station that executes, via a control-plane path, radio resource control of the user equipment; and
  a second base station that does not execute radio resource control of the user equipment, the first base station comprising:
  a measurement report message receiver configured to receive a measurement report message regarding radio waves transmitted from the base stations, the message being transmitted from the user equipment;
  a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path is established between the second base station and the user equipment in association with the third user-plane path; and
  a user-plane path controller configured to, in a case in which the determiner determines to establish the first user-plane path, establish the first user-plane path between the user equipment and the first base station.

6. The radio communication system according to claim 5,
wherein, when the determiner determines to establish the first user-plane path, the user-plane path controller of the first base station transmits, to the second base station, a path release request message requiring release of the fourth user-plane path, the second base station comprising:
  a user-plane path processor configured to release the fourth user-plane path based on the path release request message, and to transmit a path release response message to the first base station after releasing the fourth user-plane path, and wherein the user-plane path controller of the first base station, upon receiving the path release response message, releases the third user-plane path.

7. A radio communication system comprising:
a user equipment;
plural base stations;
a switching station; and
a gateway device, the plural base stations including:
  a first base station that executes, via a control-plane path, radio resource control of the user equipment; and
  a second base station that does not execute radio resource control of the user equipment, the first base station comprising:
  a measurement report message receiver configured to receive a measurement report message regarding radio waves transmitted from the base stations, the message being transmitted from the user equipment; and
  a transferor configured to transfer the measurement report message to the switching station, the switching station comprising:
  a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path between the second base station and the user equipment is established in association with the third user-plane path; and a determination result transmitter configured to transmit a determination result of the determiner to the first base station, and the first base station further comprising:

a user-plane path controller configured to, when the determination result indicates a determination that the first user-plane path is to be established, establish the first user-plane path between the user equipment and the first base station.

8. A radio communication system according to claim 7, wherein the user-plane path controller of the first base station, when the determination result indicates a determination that the first user-plane path is to be established, transmits to the second base station a path release request message requiring release of the fourth user-plane path, the second base station comprising:

a user-plane path processor configured to release the fourth user-plane path based on the path release request message, and to transmit a path release response message to the first base station after releasing the fourth user-plane path, and wherein the user-plane path controller of the first base station, upon receiving the path release response message, releases the third user-plane path.

9. A radio communication system according to claim 5, wherein the first base station further comprising:

a radio connection controller configured to transmit a radio connection reconfiguration message, and wherein in a case in which the first user-plane path is to be established, when a user-plane path already exists between the user equipment and the first base station, the user-plane path controller of the first base station associates the user-plane path with the second user-plane path to regard the user-plane path as the first user-plane path, whereas when a user-plane path does not exist between the user equipment and the first base station, the user-plane path controller of the first base station controls the radio connection controller to transmit, to the user equipment, a radio connection reconfiguration message instructing establishment of the first user-plane path between the user equipment and the first base station.

10. A base station for use in a radio communication system having: a user equipment; plural base stations; and a gateway device, the plural base stations including: a first base station that executes, via a control-plane path, radio resource control of the user equipment; and a second base station that does not execute radio resource control of the user equipment, the first base station comprising:

a measurement report message receiver configured to receive a measurement report message regarding radio waves transmitted from the base stations, the message being transmitted from the user equipment;

a determiner configured to determine, based on the measurement report message, whether to establish a third user-plane path between the first base station and the second base station in a case in which a control-plane path and a first user-plane path are established between the user equipment and the first base station, and in which a second user-plane path is established between the first base station and the gateway device;

a user-plane path controller configured to, when the determiner determines to establish the third user-plane path, establish the third user-plane path between the first base station and the second base station, and to associate the established third user-plane path with the second user-plane path; and a radio connection configurator configured to transmit, to the user equipment, a radio connection reconfiguration message instructing the user equipment to establish a fourth user-plane path between the user equipment and the second base station.

11. A base station for use in a radio communication system having a user equipment; plural base stations; and a gateway device, the plural base stations including: a first base station that executes, via a control-plane path, radio resource control of the user equipment; and a second base station that does not execute radio resource control of the user equipment, the first base station comprising:

a measurement report message receiver configured to receive a measurement report message regarding radio waves transmitted from the base stations, the message being transmitted from the user equipment;

a determiner configured to determine based on the measurement report message whether to establish a first user-plane path between the user equipment and the first base station in a case in which a control-plane path is established between the user equipment and the first base station, in which a second user-plane path is established between the gateway device and the first base station, in which a third user-plane path between the first base station and the second base station is established in association with the second user-plane path, and in which a fourth user-plane path between the second base station and the user equipment is established in association with the third user-plane path; and a user-plane path controller configured to, in a case in which the determiner determines to establish the first user-plane path, establish the first user-plane path between the user equipment and the first base station.

* * * * *